Patented Nov. 29, 1949

2,489,351

UNITED STATES PATENT OFFICE 2,489,351

PREPARATION OF BENZOTRIAZINE COMPOUNDS

Frank J. Wolf, Westfield, and Karl Pfister, III. Summit, N. J., assignors to Merck & Co., Inc., Rahway, N. J., a corporation of New Jersey No Drawing. Application April 10, 1946, Serial No. 661,083

9 Claims. (Cl. 260—249.5)

This invention relates to the preparation of new chemical compounds by new and improved chemical procedures. More particularly, it relates to the preparation of certain new benzotriazine compounds by reduction of the corresponding N-oxides, utilizing in the procedure a new and improved reduction method which does not require the isolation of any intermediate dihydro compounds which may be formed.

The new chemical compounds produced in accordance with my method, particularly certain 7-chloro and 7-bromo derivatives of 3-aminobenzotriazine-1,2,4 compounds, possess potential therapeutic value for use as antimalarials.

In carrying out our improved process to secure certain new chemical compounds possessing potential therapeutic activity, we may start with substituted 3-amino-benzotriazine-1,2,4-oxides-1. The preparation of such compounds from readily available starting materials is disclosed and claimed in our co-pending patent application, Serial No. 661,084, filed April 10, 1946. The co-pending application Serial No. 661,084 discloses the preparation of substituted 3-amino-1,2,4-benzotriazine-oxides-1 by reacting substituted orthonitroaniline with cyanamide.

While benzotriazine-1,2,4-oxides have previously been subjected to chemical reduction, the method has been applied only in connection with benzotriazine-1,2,4-oxides containing no substituents (other than hydrogen) attached to the benzene ring portion of the molecule. Moreover in previous reductions it has been considered essential to utilize stannous chloride, and this procedure results in a dihydro derivative of the benzotriazine compound which must then be separated and oxidized back to the desired benzotriazine compound. In our improved process, not only is the method applicable with substituted benzotriazine-1,2,4-oxides-1 which contain substituents on the benzene ring portion of the molecule, but any dihydro derivative which may be formed during the reduction need not be isolated, but is directly converted during the reaction to the desired desoxy derivative. Moreover, our improved process utilizes certain catalytic agents which permit the reduction to proceed and the desoxy benzotriazine compound to be formed in high yields during the reaction.

In carrying out our process the substituted 3-amino-benzotriazine-1,2,4-oxide-1, which may be and is preferably one substituted in the benzene ring portion of the molecule, such as a 7-halo-3-amino-benzotriazine-1,2,4-oxide-1, is subjected to the action of suitable reducing agents for sufficient time to bring about the desired reduction and to convert the compounds to the desired benzotriazine derivatives. Among suitable reducing agents we have secured best results with hydrogen in the presence of a suitable catalyst such as Raney nickel. However other reducing agents such as red phosphorus and iodine in acidic solution may be utilized in the reduction.

In the reduction, especially where a reducing agent such as hydrogen under pressure in the presence of a catalyst is employed, there is the possibility that some of the starting material may be converted to the dihydro form by the reduction being carried past the desoxy phase. In accordance with our improved process it is not essential to separate the dihydro derivative, as it may be readily oxidized to the desired benzotriazine compound by the addition of an oxidizing agent such as ferric chloride or air. In addition to Raney nickel various other well known hydrogenation catalysts such as palladium suspended on activated carbon or Adams platinum may be utilized.

New chemical compounds which we have prepared in accordance with this method, and their respective physical properties, are given below:

3-amino-7-chloro-benzotriazine-1,2,4, melting point 255–256° C.

3-amino-7-bromo-benzotriazine-1,2,4, melting point 256° C.

3-amino-6-chloro-benzotriazine-1,2,4, melting point 250–251° C.

3-amino-7-methoxy-benzotriazine-1,2,4, melting point 221–222° C.

3-amino-5-methyl-benzotriazine-1,2,4, melting point 207–208° C.

3-amino-7-methyl-benzotriazine-1,2,4, melting point 217–218° C.

The following examples illustrate our improved method, and the new chemical compounds thereby produced.

Example 1

A suspension of 30 grams of 3-amino-7-chloro-benzotriazine-1,2,4-oxide-1 in 500 milliliters of pyridine was prepared and Raney nickel catalyst added thereto. The suspension was then shaken with hydrogen under a pressure of 2–3 atmospheres until the suspended material had dissolved. Approximately 1.5 to 1.7 equivalents of hydrogen were absorbed.

The mixture was then separated from the catalyst and concentrated to dryness under reduced pressure. A small amount of air was admitted to oxidize a part of the over-reduced dihydro compound to the desired benzotriazine derivative. Water was then added to the residue and the precipitate filtered. The mother liquor was then acidified with acetic acid and a solution of ferric chloride was added to precipitate additional product. The yield, of 3-amino-7-chloro-benzotriazine-1,2,4, was 55-65% of theoretical.

Example 2

A suspension of 20.0 grams of 3-amino-7-bromo-benzotriazine-1,2,4-oxide-1 in 295 milliliters of glacial acetic acid and 5 milliliters of water was prepared. 4 grams of red phosphorus and 1.5 grams of iodine were added to the suspension, which was then heated to reflux and refluxed, with stirring, for 18 hours.

The reaction mixture, containing 3-amino-7-bromo-benzotriazine-1,2,4 and some over-reduced dihydro derivative was then filtered to free it from unreacted phosphorus. It was concentrated to a volume of 50 milliliters under reduced pressure, air in small amounts being admitted thereto to convert some of the dihydro compound to the desired benzotriazine product. 200 milliliters of water were then added and the precipitated product filtered off. Ferric chloride solution was then added to the mother liquor to oxidize additional amounts of the dihydro product remaining therein and, in this way, an additional 1.5 grams of product was secured. This product was 3-amino-7-bromo-benzotriazine-1,2,4, and it was obtained in very satisfactory yields.

Example 3

3-amino-6-chloro-benzotriazine-1,2,4, melting point 250-251° C.

3-amino-7-methoxy-benzotriazine-1,2,4, melting point 221-222° C.

3-amino-5-methyl-benzotriazine-1,2,4, melting point 207-208° C.

3-amino-7-methyl-benzotriazine-1,2,4, melting point 217-218° C.

These compounds were all prepared by the same general procedure. A suspension of 1 g. of the oxide, 200 mg. of red phosphorus and 75 mg. of iodine in 15 ml. of glacial acetic acid was refluxed 18 hours. The reaction mixture was concentrated in vacuo and the residue recrystallized from ethanol after washing with water. Yields were not determined.

The melting points observed were as follows:

*Substituted 3-amino-benzothiazine 1,2,4*

| Substituent | Oxide-1 | Desoxy |
|---|---|---|
|  | Degrees | Degrees |
| 6-chloro | 293 | 250-251 |
| 7-methoxy | 258-259 | 221-222 |
| 5-methyl | 258-260 | 207-208 |
| 7-methyl | 265-270 | 217-218 |

Various changes and modifications might be made in our invention as described which would still fall within the scope of our invention as defined by the appended claims.

We claim:

1. 3-amino-7-halo-benzotriazine-1,2,4 having the formula:

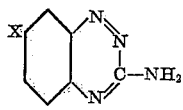

wherein X is a halogen.

2. 3-amino-7-chloro-benzotriazine-1,2,4.
3. 3-amino-7-bromo-benzotriazine-1,2,4.
4. The process of preparing 3-amino-7-halo-benzotriazine-1,2,4 which comprises reducing 3-amino-7-chloro-benzotriazine-1,2,4-oxide-1 with hydrogen in the presence of a hydrogenation catalyst and recovering 3-amino-7-halo-benzotriazine-1,2,4.
5. The process of preparing a 3-amino-7-halo-benzotriazine-1,2,4 which comprises reducing 3-amino-7-halo-benzotriazine-oxide-1 with hydrogen in the presence of a hydrogenation catalyst and adding an oxidizing agent to the reaction mixture in order to oxidize any dihydro derivative formed to 3-amino-7-halo-benzotriazine-1,2,4- and recovering said benzotriazine 1,2,4 having the formula:

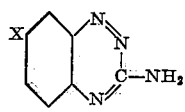

wherein X represents halogen.

6. The process of preparing 3-amino-7-halo-benzotriazine-1,2,4 which comprises reducing a 3-amino-7-halo-benzotriazine-1,2,4-oxide-1 with iodine in the presence of phosphorous as a catalyst and recovering the 3-amino-7-halo-benzotriazine-1,2,4.
7. The process of preparing 3-amino-7-halo-benzotriazine-1,2,4 which comprises reducing a 3-amino-7-halo-benzotriazine-1,2,4-oxide-1 with iodine in the presence of phosphorous as a catalyst and adding an oxidizing agent to the reaction mixture in order to convert any dihydro derivative formed to the 3-amino-7-halo-benzotriazine-1,2,4, and recovering said benzotriazine-1,2,4 having the formula:

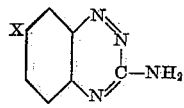

wherein X represents halogen.

8. The process of preparing 3-amino-7-halo-benzotriazine-1,2,4 which comprises reducing a 3-amino-7-halobenzotriazine-1,2,4-oxide-1 and recovering the 3-amino-7-halobenzotriazine-1,2,4 having the formula:

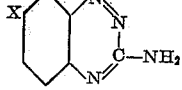

wherein X represents halogen.

9. The process of preparing 3-amino-7-halo-benzotriazine-1,2,4 which comprises reducing a 3-amino-7-halobenzotriazine-1,2,4-oxide-1, oxidizing any dihydro derivative formed and recovering the resulting 3-amino-7-halobenzotriazine-1,2,4 having the formula:

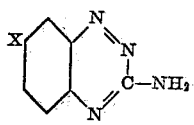

wherein X represents halogen.

FRANK J. WOLF.
KARL PFISTER, III.

(References on following page)

REFERENCES CITED

The following references are of record in the file of this patent:

UNITED STATES PATENTS

| Number | Name | Date |
|---|---|---|
| 2,197,357 | Widmer | Apr. 16, 1940 |

FOREIGN PATENTS

| Number | Country | Date |
|---|---|---|
| 486,577 | Great Britain | 1938 |

OTHER REFERENCES

Bischler Berichte 22 (1889), pages 2817, 2818, 2806.
Arndt: Berichte 46, pages 3522–3529.
Arndt: Berichte 50, pages 1248–1261.
Beilstein (addition volume), vol. 26, pp. 42, 44.
Chem. Abstracts, vol 8, p. 685.
Parkes: Chem. Soc. J. (1938), pages 1842–1843.